United States Patent [19]
van den Berg

[11] Patent Number: 6,142,098
[45] Date of Patent: Nov. 7, 2000

[54] TEAT CUP AND A MILKING ROBOT COMPRISING SAME

[75] Inventor: Karel van den Berg, Bleskensgraaf, Netherlands

[73] Assignee: Maasland N.V., Maasland, Netherlands

[21] Appl. No.: 09/478,350

[22] Filed: Jan. 6, 2000

Related U.S. Application Data

[63] Continuation of application No. PCT/NL99/00279, May 6, 1998.

[30] Foreign Application Priority Data

May 6, 1998 [NL] Netherlands ............................. 1009075

[51] Int. Cl.$^7$ ........................................................ A01J 5/16
[52] U.S. Cl. ............................................................ 119/14.51
[58] Field of Search .............................. 119/14.51, 14.49, 119/14.47

[56] References Cited

U.S. PATENT DOCUMENTS

| | | |
|---|---|---|
| 2,578,184 | 11/1951 | Green . |
| 2,694,379 | 11/1954 | Hern . |
| 3,079,891 | 3/1963 | Miller . |
| 4,745,881 | 5/1988 | Larson . |

*Primary Examiner*—Peter M. Poon
*Assistant Examiner*—Yvonne R. Abbott
*Attorney, Agent, or Firm*—Penrose Lucas Albright

[57] ABSTRACT

At least part of the length of a teat cup for milking the teat of an animal is flexible or deformable or both. The teat cup is mounted on a robot arm in a fully automated milking system so as to be releasably retained on the robot arm in a fixed, predetermined orientation relative thereto. A compression spring coated with vulcanized rubber is retained in the cover or jacket of the teat cup. A cord connected to the upper part of the teat cup is pulled to bend the teat cup by at least about 90° relative to the vertical so that undesired material is less likely to enter the opening at the top of the teat cup and the teat cup is more compact and shorter between milkings. The cord used to bend the teat cup also function to retain the teat cup firmly on the robot arm in its fixed orientation relative thereto when the teat cup is not connected or being connected to a teat. When the cord is released the spring in the teat cup's jacket causes the teat cup to assume its operable upright disposition. The spring also facilitates the pulsation function of the teat cup and reduces the wear to which the pulsation liner is otherwise subjected.

25 Claims, 3 Drawing Sheets

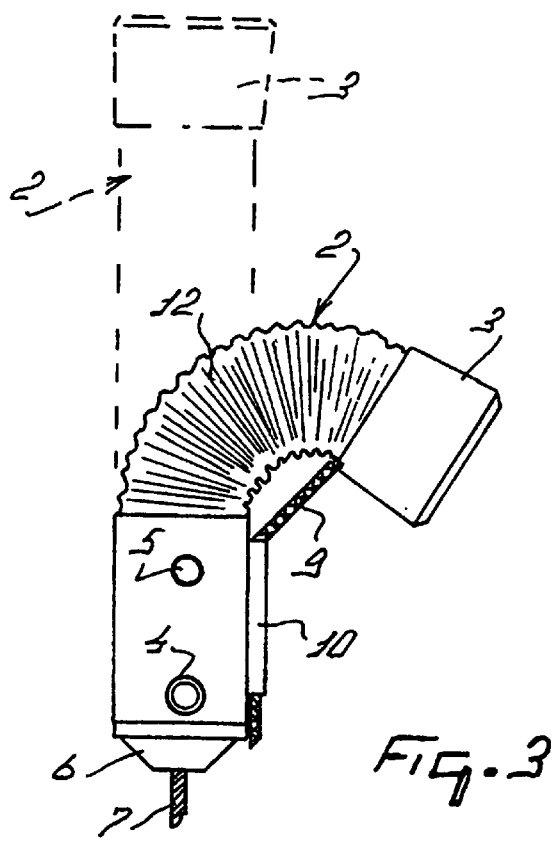
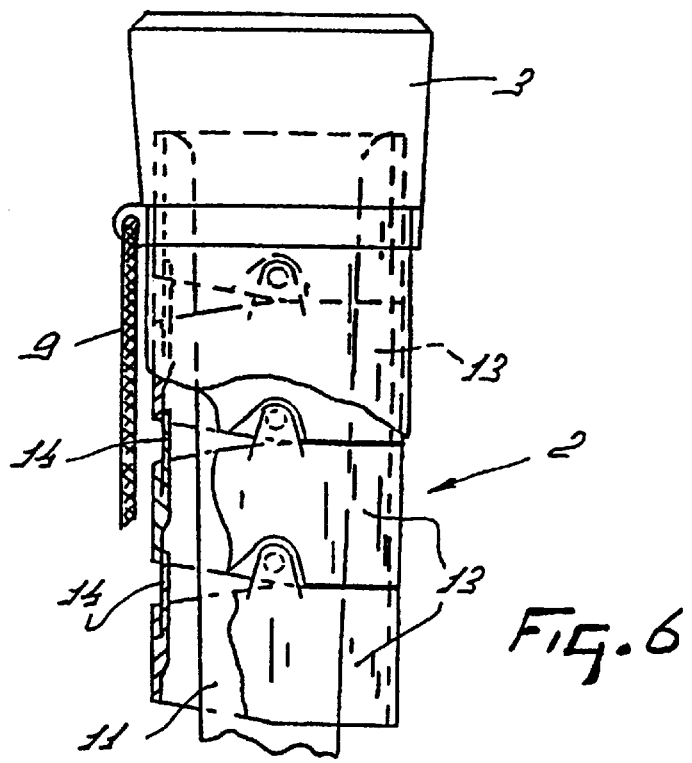

TEAT CUP AND A MILKING ROBOT COMPRISING SAME

RELATED APPLICATION

This Application is a continuation of International Application No. PCT/NL99/00279, filed May 6, 1998.

FIELD OF INVENTION

The invention relates to a teat cup and more particularly to a robot controlled teat cup used in a fully automated milking system.

BACKGROUND OF THE INVENTION

Known teat cups are substantially cylindrical and have an opening in their upper ends. In general in a fully automated milking system they are positioned vertically on the robot arm of a milking robot. This has, inter alia, the disadvantage that before and after milking, dirt and contaminates may enter into the teat cup from above and the necessary hygiene cannot therefore be guaranteed. In addition, conventional teat cups occupy a considerable amount of space.

SUMMARY OF THE INVENTION

An object of the invention is to obviate the above-mentioned drawbacks and provide an improved teat cup. According to the invention this is achieved by providing that at least part of the teat cups's length is flexible or deformable or both. With the teat cup being flexible or deformable or both, it can be stored more compactly before and after milking. Further the end of the teat cup can be diverted from a vertical working position, so that the risk of dirt and contaminations entering the teat cup is reduced.

In accordance with an inventive feature, the teat cup is designed in such a manner that the upper end of the teat cup can be bent in an inverted "U" configuration whereby the upper end is directed towards the other end. Thus, accordingly to a further inventive feature, the teat cup is provided with means for bending one end of the teat cup so that it is directed towards the other end. According to another inventive feature, the bending means comprise a pulling element, such as a cord, that is fastened to the lateral side of the teat cup at the upper part thereof and extends downwardly along the teat cup. According to still another inventive feature, the pulling element extends partially through a guide element.

According to a yet further inventive feature, one end of the teat cup can be bent in the direction of the other end so that a central axis of one end makes an angle not greater than 90° with a central axis of the other end. This provides the advantage that the height of the teat cup is substantially reduced.

In accordance with another inventive feature, the teat cup is provided with means for bending the teat cup back into its substantially upright shape. According to still another inventive feature, the teat cup automatically assumes its substantially upright shape in the unloaded condition, so that bending back means, as such, are superfluous.

According to yet another inventive feature, the portion of the teat cup which is flexible or deformable or both, comprises a spring. Accordingly, an inexpensive embodiment is obtained in a simple manner. Moreover, the spring may facilitate the pulsating movement carried out by the liner of the teat cup during milking, so that the liner will wear out less quickly. According to a further invention feature, the spring is a prestressed compression spring. This has the advantage that the prestressed compression spring makes it possible for the liner of the teat cup to remain stressed for a longer period of time and to slacken less quickly, which influences the life of the teat cup in a positive manner.

In accordance with a further inventive feature, the spring is vulcanized. According to again another inventive feature, the spring is disposed in a prestressed casing.

According to a still further inventive feature, the portion of the teat cup which is flexible or deformable or both comprises a number of substantially ring-shaped elements that are interconnected in a hinged or flexible manner.

According to again another inventive feature, the teat cup or the robot arm or both are provided with means for positioning the teat cup on the robot arm, the positioning means with the aid of the bending means, fixing the teat cup in a predetermined orientation relative to the robot arm. If necessary, the positioned teat cup can then be rotated into the desired position.

In accordance with the invention the teat cup can be utilized in a very advantageous manner in an automatic milking apparatus or as controlled by a milking robot. With such a milking robot having at least one robot arm provided with a least one teat cup, according to the invention, the upper end of the teat cup can be bent into a position in which it is orientated horizontally or downwardly. In this manner dirt is prevented from entering the teat cup from above. Moreover, the height of the teat cup is decreased in this position.

According to an inventive feature, the teat cup or the robot arm or both are provided with means for positioning the teat cup on the robot arm, the positioning means being such that, when positioned, the teat cup is placed automatically in a fixed, predetermined orientation relative to the robot arm. According to again another inventive feature, the positioning means comprise a protrusion and a recess cooperating therewith. According to a still further inventive feature, the protrusion and the recess have the shape of half an egg (in longitudinal cross-sectional).

BRIEF DESCRIPTION OF THE DRAWINGS

The invention will now be explained in further detail with reference to the accompanying drawings.

FIG. 3 is a schematic side elevational view of a teat cup according to the invention;

FIG. 6 is a partial schematic side elevational view of another embodiment of the teat cup.

DETAILED DESCRIPTION OF THE PREFERRED EMBODIMENTS

Figure 1:
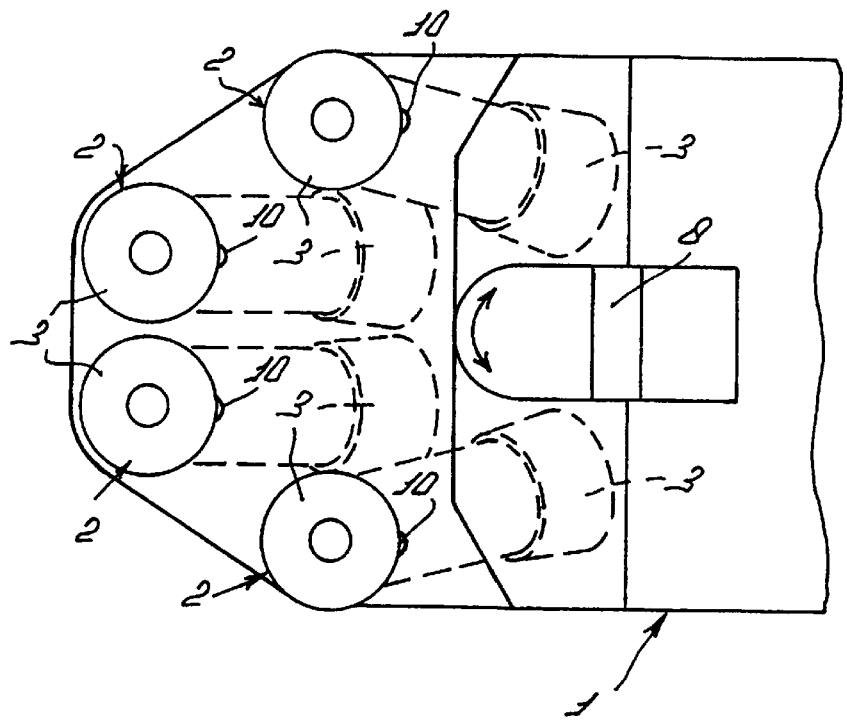
FIG. 1 is a schematic plan view of an end of a robot arm of a milking robot provided with teat cups according to the invention.
Figure 2:
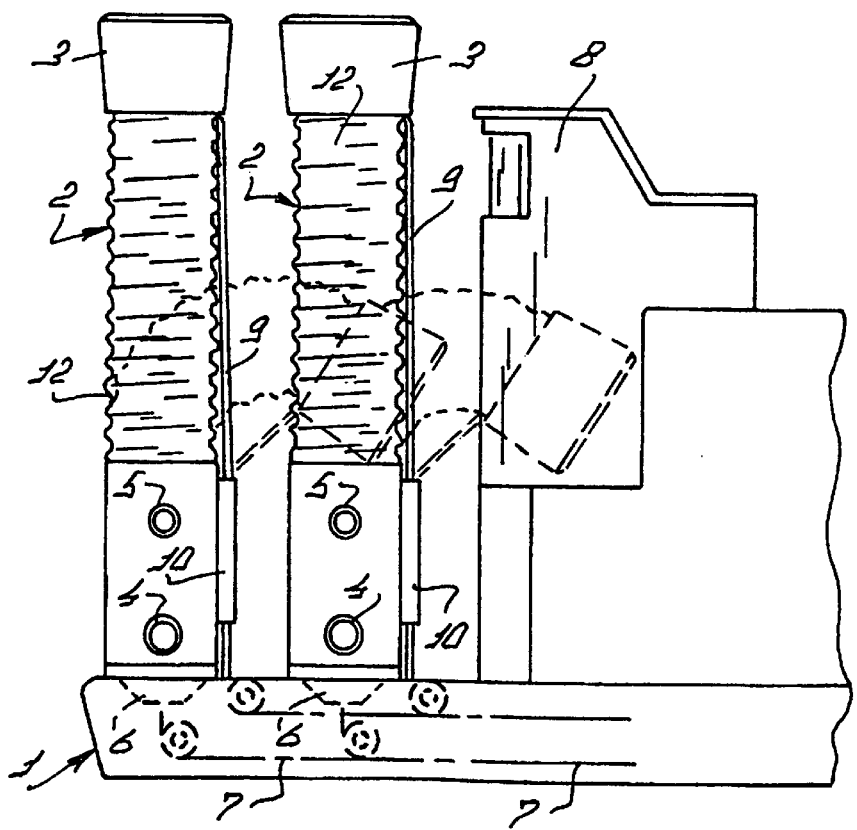
FIG. 2 is a schematic side elevational view of the milking robot of FIG. 1.

FIGS. 1 and 2 show a schematic plan view and a schematic side view, respectively, of an end of a robot arm 1 of a milking robot provided with teat cups 2 according to the invention. Robot arm 1 is provided with four teat cups 2 for receiving and conveying the milk yielded, said teat cups 2 being provided internally with rubber liners which are well known in the art, and which are connected at their upper sides with teat cups 2 via mouthpieces 3 (see also FIG. 5). Each teat cup 2 is connected to a milk line 4 in which there is a permanently prevailing vacuum. Via each vacuum line 4 milk is discharged from a relevant teat cup 2 for the purpose of being processed further. To each teat cup 2, a pulse tube 5 is also connected which is adapted to produce changes in the pressure in the space between the outer wall, comprising a jacket or cover, of teat cup 2 and the liner, which changes in pressure cause the flexible, deformable liner to be alternately squeezed in a release phase and reopened in a subsequent suction phase during milking.

By means of a protrusion 6 fitting in a corresponding recess and cooperating therewith, each teat cup 2 is positioned at its lower side on a milking cluster or, as shown, on robot arm 1. Of course, protrusion 6 may also be arranged on robot arm 1, the corresponding recess being provided at the lower side of teat cup 1. With the aid of a cord 7 passed through robot arm 1, teat cup 2 is connected with robot arm 1. After milking, teat cup 2 can be pulled back via cord 7 to robot arm 1 and be positioned there with the aid of protrusion 6 and the recess corresponding therewith.

Protrusion 6 and the recess are preferably designed in such a manner that, upon positioning of teat cup 2, when cord 7 pulls protrusion 6 against the recess, teat cup 2 is automatically fixed in a predetermined orientation relative to robot arm 1. This may be achieved by a plurality of embodiments; for example, protrusion 6 and recess may have the shape of half of an egg (the egg being divided longitudinally). The predetermined orientation is relevant in relation to the means for bending teat cup 2, which means will be described in he following.

Furthermore robot arm 1 is provided with means 8 known per se for detecting the positions of teats of an animal to be milked, and with control means for emplacement of the teat cups on corresponding teats. The detection means comprise a laser and suitable sensors.

According to the invention at least part of the length of teat cup 2 is flexible or deformable or both. As a result thereof teat cups 2 can be bent downwardly from their vertical working position (see FIG. 2) as indicated by dashed lines in FIGS. 1 and 2. As shown the upper end of teat cup 2 is turned so that it is directed toward the lower end.

Each teat cup 2 is preferably provided with means 9 for bending one end of the teat cup in the direction of the other end. These means may be designed in various manners and comprise in the embodiment shown a cord that is fastened to the lateral side of the teat cup at the upper part thereof and which extends downwardly toward robot arm 1. Cord 9 extends partially through a guide element 10. By pulling cord 9, teat cup 2 can be bent. In a further embodiment, cords 7 and 9 can be combined so as to form one single cord by means of which both the positioning of the teat cup 2 on robot arm 1 and the subsequent bending for positioned teat cup 2 can be effected.

In accordance with a further embodiment, teat cup 2 or robot arm 1 or both are provided with means comprising protrusions 6 or cord 7 or both for positioning teat cup 2 on robot arm 1, the positioning means, protrusion 6 and cord 7, being designed in such a manner that after teat cup 2 has been positioned, said teat cup 2 can be fixed in a predetermined orientation relative to the robot arm 1 with the aid of bending means 9. For example, protrusion 6 and the corresponding recess may be conical configurations. In this situation, the positioned teat cup 2 can be rotated, if necessary, into the desired position by means of cord 9.

Figure 4:
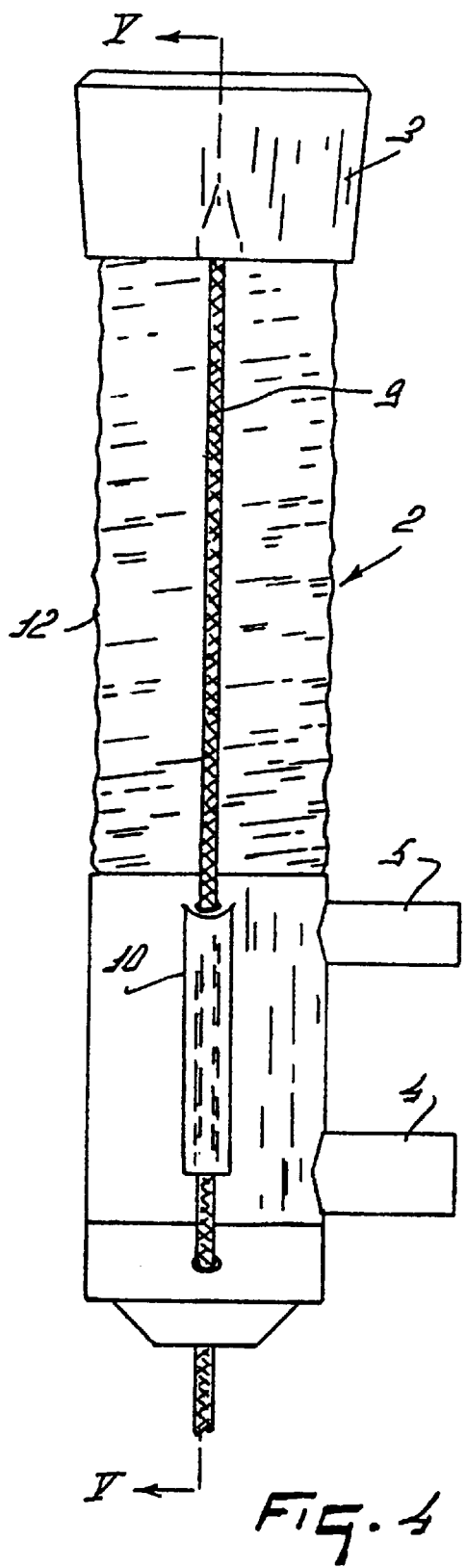
FIG. 4 is a further schematic side elevational view of the teat cup of FIG. 3.

This is shown more clearly in FIG. 3 which is a schematic side view of teat cup 2. The vertical working position of teat cup 2 is indicated by the dashed lines. One end of teat cup 2 can be bent in the direction of the other end to that degree that a central axis of one end encloses an angle of not more than 90° with a central axis of the other end. In this situation, the lower end of teat cup 2 is positioned substantially vertically on the robot arm 1 and the upper end is orientated horizontally or downwardly. FIG. 4 shows a further schematic side view of teat cup 2 of FIG. 3.

Teat cup 2 may be provided with means for bending it back into its substantially straight shape. Teat cup 2 may also be structurally urged to reassume its substantially straight shape in the unloaded condition. For example, the flexibility of teat cup 2 may resiliently return it to an upright position as soon as cord 9 is released.

Figure 5:
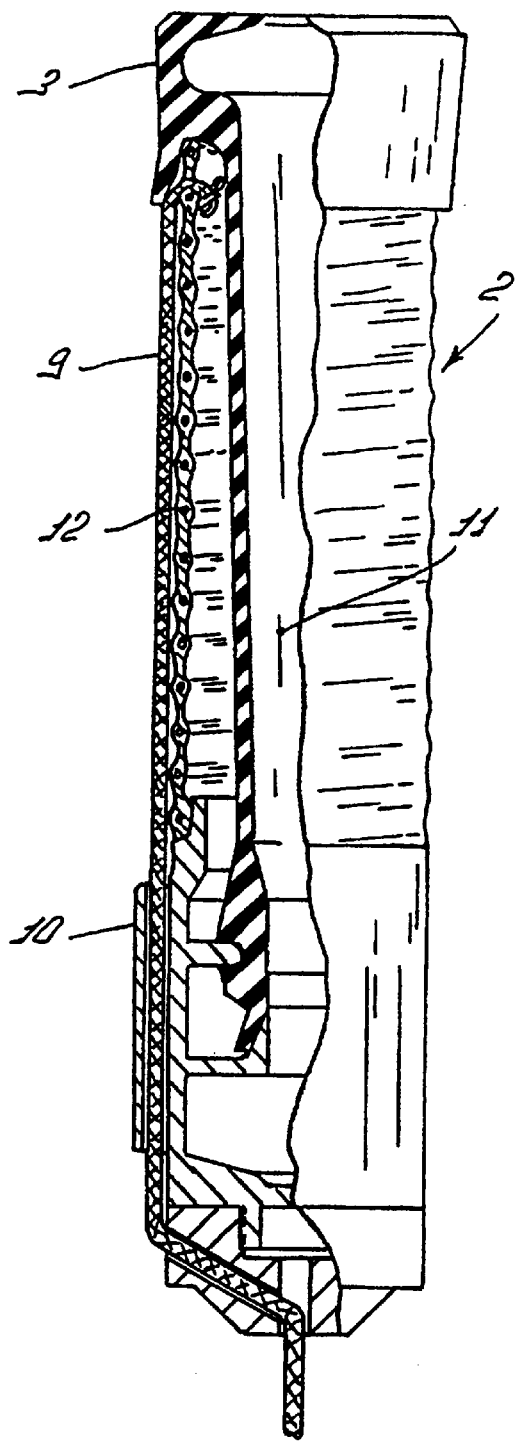
FIG. 5 is a schematic, partial longitudinal cross-section of the teat cup of FIG. 4 taken on line V—V thereof.

FIG. 5 shows a schematic, partial longitudinal cross-section of teat cup 2 taken on line V—V in FIG. 4. At the level of guide element 10, teat cup 2 with liner 11 comprises a rigid metal portion and thereabove a portion which is flexible or deformable or both (extending up to mouthpiece 3). In the embodiment shown this is achieved in that the flexible, deformable portion of teat cup 2 comprises a spring 12 which is vulcanized. This is an inexpensive but efficient embodiment. During milking, liner 11 of teat cup 2 executes its conventional pulsating movement. Spring 12 ensures that this movement can be made with little stretching of liner 11 in longitudinal direction. As a result thereof liner 11 will last longer.

Spring 12 is preferably a prestressed compression spring to be disposed in a prestressed casing. This makes it possible for liner 11 to remain stressed for a longer period of time and to slacken less quickly, which influences the life of teat cup 2 in a positive manner.

FIG. 6 is a schematic side view of another embodiment of the teat cup. The portion of teat cup 2 which is flexible or deformable or both comprises a number of substantially ring-shaped elements 13 that are interconnected in a hinged or flexible manner. In the embodiment shown, ring-shaped elements 13 are interconnected in a hinged manner and designed so that at side of bending means 9 some clearance is provided between elements 13 when teat cup 2 is in its vertical working position. This clearance is bridged by resilient intermediate elements 14 which are connected with two of elements 13. When bending teat cup 2 by means of bending means 9, resilient intermediate elements 14 are pressed, so that the ring shaped elements 13 permit teat cup 2 to bend to the left as seen in FIG. 6.

Although I have disclosed the preferred embodiments of my invention, it is to be understood that it is capable of other adaptations and modifications within the scope of the following claims.

Having disclosed my invention, what I claim as new and to be secured by letters patent of the United States of America is:

1. A teat cup for milking a teat of an animal to be milked, which comprises an upper opening at its upper aspect to receive a teat of an animal to be milked, a pulsation liner, a milk discharge opening at its lower aspect, a cover which surrounds said pulsation liner, a pulsation opening to a space between said cover and said pulsation liner, said cover being flexible for at least part of its length whereby it can be bent at least about 90° from the vertical to reduce undesired matter from entering said upper opening when said cover is so bent.

2. A teat cup in accordance with claim 1, wherein said cover can be bent so that said upper opening is directed downwardly and said cover generally has the configuration of an inverted "U".

3. A teat cup in accordance with claim 1, wherein said teat cup is provided with bending means for bending said upper opening of said teat cup in the direction of said other end.

4. A teat cup in accordance with claim 3, wherein said bending means comprises a pulling element that is fastened to a lateral side of the teat cup at an upper part thereof and which extends downwardly therefrom adjacent said cover.

5. A teat cup in accordance with claim 4, which comprises a guide element for said pulling element which receives said pulling element.

6. A teat cup in accordance with claim 3, wherein the teat cup at said upper opening is capable of being bent downwardly so that a central axis of the teat cup forms an angle with a further central axis of said upper opening which is not more than about 90°.

7. A teat cup in accordance with claim 3, comprising straightening means for returning the teat cup after it has been bent back to a substantially straight configuration.

8. A teat cup in accordance with claim 3, comprising resilient straightening means which automatically straightens the teat cup when said bending means is released.

9. A teat cup in accordance with claim 1, wherein said cover comprises a resilient member.

10. A teat cup in accordance with claim 9, wherein said resilient member comprises a spring.

11. A teat cup in accordance with claim 10, wherein said spring comprises a pre-stressed compression spring.

12. A teat cup in accordance with claim 11, wherein said spring is coated with a vulcanized material.

13. A teat cup in accordance with claim 1, wherein said cover comprises a pre-stressed casing and a spring is disposed in said pre-stressed casing.

14. A teat cup in accordance with claim 1, wherein said cover comprises a plurality of interconnected substantially ring-shaped elements.

15. A teat cup in accordance with claim 14, wherein said substantially ring-shaped elements are interconnected by hinge means.

16. A teat cup in accordance with claim 14, wherein said substantially ring-shaped elements are interconnected by flexible means.

17. A teat cup in accordance with claim 1, in combination with a milking robot having at least one robot arm on which the teat cup is removably mounted.

18. A combination in accordance with claim 17, providing positioning means for removably positioning the teat cup on said robot arm, said positioning means cooperating with the teat cup and said robot arm to position the teat cup on said robot arm in a fixed, predetermined orientation relative to said robot arm.

19. A combination in accordance with claim 18, wherein said positioning means comprises a protrusion and a corresponding recess cooperating therewith.

20. A combination in accordance with claim 19, wherein said protrusion and said recess each have a configuration corresponding to that of one-half of an egg which has been divided longitudinally.

21. A combination in accordance with claim 19, comprising bending means for bending said cover to reduce undesired matter from entering said upper opening when said cover is bent by said bending means, said bending means cooperating with said positioning means to urge said robot arm and the teat cup into a fixed, predetermined orientation relative to each other.

22. A combination in accordance with claim 21, wherein said bending means comprises a flexible member.

23. A combination in accordance with claim 22, wherein said flexible member comprises a cord.

24. A fully automated milking system comprising a milking robot having at least one robot arm, a teat cup releasably mounted on said robot arm, said teat cup comprising an upper opening for receiving the teat of the animal to be milked, a pulsator liner, a milk discharge conduit, a cover surrounding said pulsator liner, and a pulse tube communicating with a space between said pulsator liner and said cover, said cover comprising a resilient member, bending means associated with said cover for bending said cover through an angle of at least about 90° and mounting means for releasably mounting said teat cup in a fixed orientation on said robot arm.

25. In a fully automated milking system, a milking robot having at least one robot arm, a teat cup for milking an animal, said teat cup extending upwardly from said robot arm, said teat cup comprising an opening in its upper aspect for receiving the teat of an animal being milked, a pulsation liner extending downwardly from said opening, a discharge opening which communicates for the interior of said pulsation liner, a cover which surrounds said pulsation liner and a pulsation conduit in communication with a space between said pulsation liner and said cover, mounting means for releasably mounting said teat cup on said robot arm in a fixed, predetermined orientation relative to said robot arm, bending means for bending said teat cup, said bending means comprising a flexible means which is interconnected to said cover in its upper aspect and which can be pulled to bend said cover whereby the central axis of said opening is turned through an angle which is at least about 90°, said flexible means also releasably retaining said teat cup in said fixed, predetermined orientation relative to said robot arm.

* * * * *